United States Patent [19]
Tillotson et al.

[11] Patent Number: 5,621,847
[45] Date of Patent: Apr. 15, 1997

[54] DYNAMIC VACUUM EVAPORATION SYSTEM

[75] Inventors: Barton D. Tillotson, Allen; Anthony J. Schleisman, Plano; David S. Bollinger, Grapevine; Stephen C. Skinner, Colleyville, all of Tex.

[73] Assignee: Texas Instruments Incorporation, Dallas, Tex.

[21] Appl. No.: 450,453

[22] Filed: May 25, 1995

[51] Int. Cl.$^6$ .............................. F24F 6/00; C23C 14/00
[52] U.S. Cl. .................. 392/391; 392/394; 118/50.1; 118/726; 159/DIG. 1; 159/DIG. 16; 422/288
[58] Field of Search .................... 392/391, 394; 118/50.1, 723 VE, 726; 261/24, 119.1, 142; 73/61.59; 159/16.1, 44, DIG. 1, DIG. 16, DIG. 24; 437/247; 422/287–289, 298–299

[56] References Cited

U.S. PATENT DOCUMENTS

| | | | |
|---|---|---|---|
| 2,882,693 | 4/1959 | Clay ........................................... | 159/44 |
| 4,094,269 | 6/1978 | Malinovski et al. .................... | 392/391 |
| 4,406,750 | 9/1983 | Irvin ........................................ | 159/16.1 |
| 4,834,874 | 5/1989 | Anthoney et al. ..................... | 159/DIG. 16 |
| 5,047,124 | 9/1991 | Haberland ............................... | 159/16.1 |
| 5,472,575 | 12/1995 | Parkinson et al. .................... | 159/DIG. 1 |
| 5,527,515 | 6/1996 | Clair et al. .......................... | 159/DIG. 16 |

Primary Examiner—Teresa J. Walberg
Assistant Examiner—Raphael Valencia
Attorney, Agent, or Firm—W. James Brady, III; Richard L. Donaldson

[57] ABSTRACT

An ultraclean evaporation system which includes a vessel formed of a fluoropolymer inert to hydrogen peroxide and having an impurity level less than the impurity level of samples to be analyzed therein, preferably perfluoroalkoxy (PFA). A radiant heater is spaced from the vessel for uniformly heating the contents of the vessel. A shield, manufactured of aluminum and coated with a fluoropolymer encases the vessel alone or in conjunction with the heater. An inert gas supply is coupled to the vessel with a coupler of fluoropolymer inert to hydrogen peroxide, preferably PFA. An output is provided from the vessel formed of a fluoropolymer inert to hydrogen peroxide, preferably PFA. An orifice is provided which is formed of a fluoropolymer inert to hydrogen peroxide, preferably PFA, for controlling the flow rate of the inert gas supply. The tubing has a length of at least about 3 meters. The vessel has a side wall and a bottom forming a corner and is disposed so that the corner is the lowest region of the vessel. A vacuum pump is coupled to the outlet of the vessel for creating a dynamic vacuum in the vessel to maintain the mole percentage of hydrogen peroxide vapor in the vessel below 26 mole percent. The vacuum pump is preferably a Venturi vacuum pump with the inert gas supply also directly coupled to the Venturi vacuum pump to create the dynamic vacuum conditions in the vessel. The dynamic vacuum is preferably about 100 Torr.

24 Claims, 2 Drawing Sheets

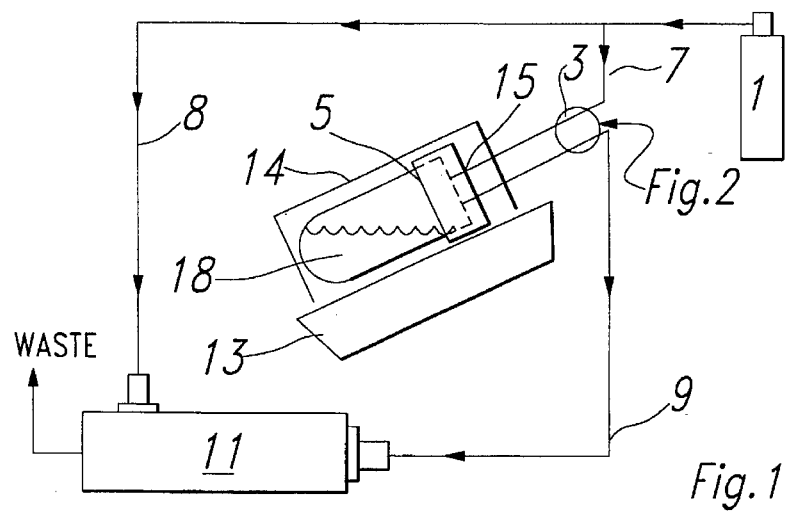
Fig. 1
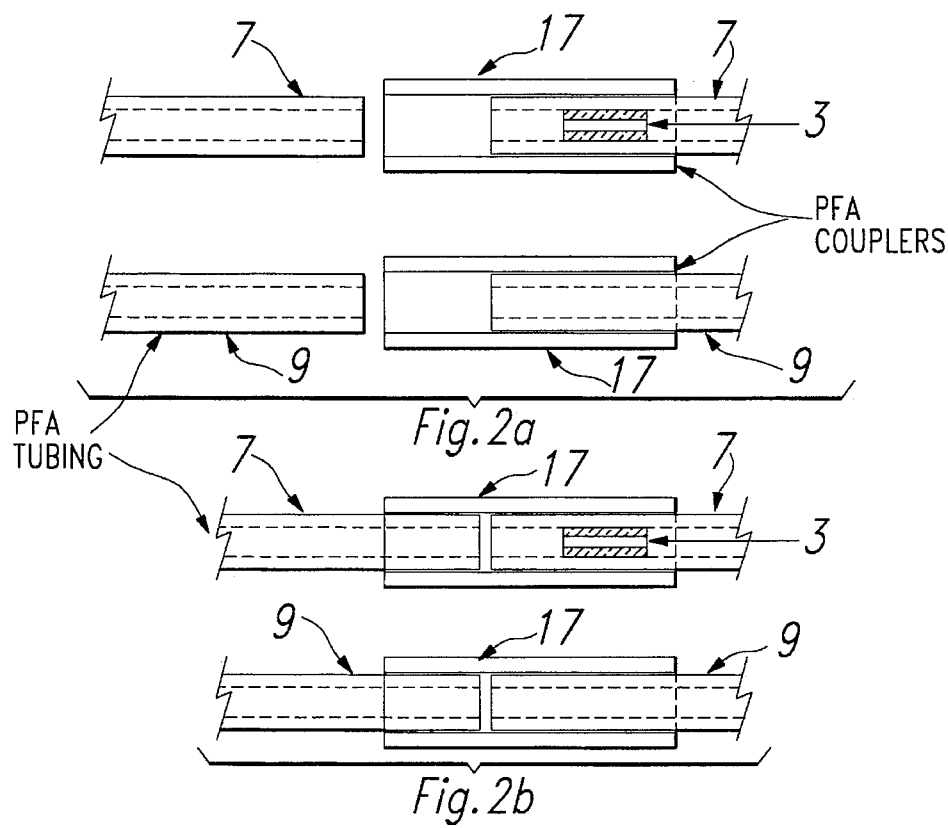
Fig. 2a
Fig. 2b

DYNAMIC VACUUM EVAPORATION SYSTEM

CROSS REFERENCE TO RELATED APPLICATIONS

This application is related to Ser. No. 08/425,280, filed Apr. 20, 1995 (TI-19683), the contents of which are incorporated herein by reference.

BACKGROUND OF THE INVENTION

1. Field of the Invention

This invention relates to an ultraclean evaporation system and, more specifically, to such a system capable of analyzing ultrapure hydrogen peroxide down to parts per trillion or quadrillion.

2. Brief Description of the Prior Art

Impurity analysis by evaporation techniques has been known in the prior art. These techniques have operated well since extremely low detection limits (i.e., 1 part/$10^{12}$ to 1 part/$10^{15}$) have not been required. However, with the continual reduction in the geometry of semiconductor devices, impurities in the involved chemicals take on greater importance because they can become an increasingly larger proportion of the volume of individual components. These impurities can and often degrade the electrical performance of the components of which they are a part. It follows that impurity concentration must be more accurately monitored.

Prior art evaporation techniques fail to provide accuracy levels of the type required for many of the newer generations of semiconductor devices due to contamination of the sample during evaporation, poor recoveries at the part per trillion to part per quadrillion level, slow evaporation times, uneven heating and poor removal of evaporated liquid from the system.

An additional problem is present during the evaporation of hydrogen peroxide for purposes of impurity measurement in that the risk of an explosion increases with the increase in the percent of hydrogen peroxide in the vapor phase. As evaporation continues, generally the water portion of the liquid phase evaporates first with the concentration of liquid phase hydrogen peroxide increasing with decrease of the volume of the liquid phase. As the percentage of water in the liquid phase decreases, the vapors will increasingly contain hydrogen peroxide vapor. Hydrogen peroxide vapors greater than 26 mole percent at atmospheric pressure are extremely explosive and accordingly present the hazard.

Furthermore, traditional evaporation schemes are plagued with slow evaporation times, uneven heating, environmental contamination and poor analyte recoveries at the part per trillion and part per quadrillion levels.

SUMMARY OF THE INVENTION

The above noted problems of the prior art are minimized in accordance with the present invention. The system herein not only provides superior results as compared with prior art systems, but is also capable of providing such results outside of a clean room and essentially eliminate the possibility of explosion.

Briefly, there is provided a closed evaporation system which controls contamination by decreasing ambient born contaminants. A capped sample vessel with a preferably friction fitting cap is made of ultrapure, thin-walled fluoropolymer, preferably perfluoroalkoxy (PFA), that decreases metallic contaminants found within the vessel material itself. The impurity level of the vessel structure and contents must be substantially lower than the impurity levels to be measured, the degree of lower impurity level being determined solely by the degree of accuracy required in the final analysis. The sample vessel is preferably a container having interior walls that are normal to the bottom, the sample vessel preferably being positioned during operation so that the lowest region thereof is a corner formed by the bottom and a side wall so that remaining sample will collect in one location at the vessel bottom. This also provides a greater surface area for evaporation to speed up evaporation. The orientation of the sample vessel greatly reduces evaporation time, thus controlling contamination and improving sample recoveries. A non-contact heating system that decreases concentration times and contamination sources has a low thermal mass that allows for fast even heating and rapid cooling and produces a minimal amount of sample refluxing.

A gas control system comprising a restrictive flow orifice formed from an ultrapure fluoropolymer controls incoming gas to the vessel. The gas is inert to the materials being evaporated as well as the evaporation system and is preferably argon. The gas is used to purge the vessel during evaporation and is under a dynamic vacuum within the system including the vessel during evaporation to maintain the mole percentage of hydrogen peroxide vapor as a part of the vapor at all point in the system below 26 mole percent. The line from the vessel to the inert gas source is ultrapure fluoropolymer material and at least about three meters in length before touching any metal to minimize the risk of impurities traveling from the metal to the vessel. High purity gases and ultrapure reagents having contamination levels on the order of and preferably less than the materials under test are always used. In addition, there are provided a further line of ultrapure fluoropolymer to transmit gas from the inert gas source to a vacuum pump, preferably a Venturi vacuum pump, as well as an ultrapure fluoropolymer line from the vessel to the vacuum pump. The vacuum pump preferably provides no oil mist and therefore preferably has no oil and no moving parts to minimize potential contamination therefrom since oil mist combined with hydrogen peroxide vapor is explosive. The Venturi pump is preferred because (1) it has no moving parts, (2) it uses no oil and therefore cannot provide an oil mist and is made of material compatible with hydrogen peroxide and (3) the argon line pressure used to operate the Venturi and purge the vessel is monitored and, if it falls below a set level, then the heat source is cut off, thereby minimizing the possibility of explosion for that reason. The total system therefore will have no moving parts. In the case of the Venturi pump, the gas will be pumped from the vessel out to the pump due to the vacuum set up by flowing the inert gas from the gas supply to the vacuum pump and across a constricted opening in the pump which is coupled to the vessel outlet line in standard manner.

The preferred fluoropolymer is ultrapure perfluoroalkoxy which is capable of withstanding temperatures up to about 250 degrees C. and inert to acids. A fluoropolymer known commercially as 440HP is the preferred perfluoroalkoxy. This fluoropolymer is presently preferred because of its availability in ultrapure form at the levels discussed herein wherever a flouropolymer is prescribed in the system except for the coating on the shield wherein other fluoropolymers can be used as well, such as, for example, tetrafluoroethylene.

In operation, a known volume of a hydrogen peroxide sample to be tested is placed in a vessel and the vessel is tilted so that a corner formed by the vessel bottom and sidewalls is at the lowest point. The vessel is then placed within a fluoropolymer coated metal shield, generally aluminum, and adjacent but spaced from a radiant heat source and the sample is uniformly heated. The coating minimizes the likelihood of contaminants which might otherwise have been attracted to or produced by the metal then entering the vessel when the vessel is later opened for analysis. Concurrently, ultrapure argon from an argon supply is passed under vacuum conditions in the vicinity of 100 Torr through a restrictive flow orifice into the vessel where it picks up volatiles from the sample formed in the vessel due to heating and carries the volatiles out of the vessel along fluoropolymer tubing to the vacuum pump and then to a scrubber or exhaust. While 100 Torr vacuum is preferred, it should be understood that the vacuum conditions can be varied substantially, it merely being necessary to maintain the mole percentage of hydrogen peroxide in the vapor phase in all parts of the system below 26 percent as is apparent from FIG. 3. The system is kept below 26 percent (actually below the explosion limit which is <40 mole percent at 100 Torr) by the dynamic flow created by purging the sample vessel and by the vacuum applied. These are two different systems working in conjunction with each other. The vacuum pump lowers the boiling point, this allowing for the evaporation of the hydrogen peroxide at a lower temperature. Furthermore, the vacuum system provides a larger safety area as explained with reference to FIG. 3. The applied gas sweeps the vessel and its contents, never allowing a mole percent of vapor above 26 percent. The combination of gas purging and vacuum (dynamic system) provides the important factors of (1) lowering the percentage of vapors in the system, (2) allowing for a closed system and (3) aiding in driving off liquid. Increasing or decreasing either the gas flow or the applied vacuum can be offset by adjusting the other parameter concurrently. This procedure continues until all of the liquid within the vessel has been removed with a solid deposit remaining in the lowermost portion of the vessel. This deposit can then be removed for analysis to determine the content and quantity thereof in standard manner.

While a single vessel has been discussed, it should be understood that plural vessels could simultaneously be supplied by the inert gas supply and simultaneously heated by the heater while within the same shield.

BRIEF DESCRIPTION OF THE DRAWING

FIG. 1 is a schematic drawing of an ultraclean evaporation system in accordance with the present invention;

FIG. 2a is a cross sectional view of the PFA restrictor and line connect of FIG. 1 in the open configuration;

FIG. 2b is a cross sectional view of the PFA restrictor and line connect of FIG. 1 in the closed configuration;

DESCRIPTION OF THE PREFERRED EMBODIMENT

Figure 3:
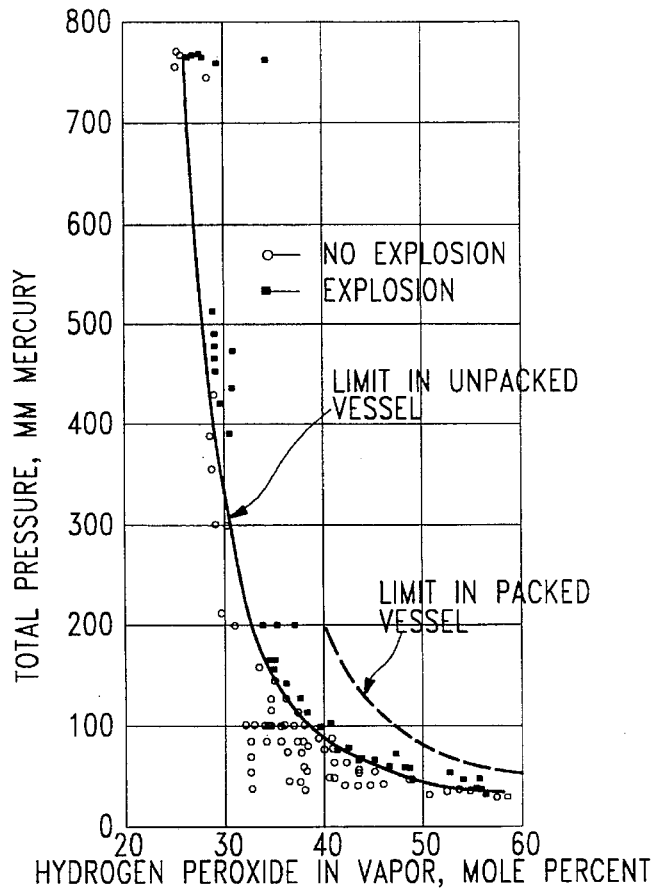
FIG. 3 is a graph showing mole percentage of hydrogen peroxide vapor in mole percent as a function of total pressure in mm Hg.

Referring to FIG. 1, there is shown an evaporation system in accordance with the present invention. The system includes an ultrapure inert gas source in the form of an argon supply 1 coupled through a restrictive flow orifice 3 (better shown in FIGS. 2a and 2b) of ultrapure perfluoroalkoxy (PFA) to a vessel 5 of ultrapure PFA via a tube 7 of ultrapure PFA having a length from the argon supply 1 to the vessel 5 of at least about 3 meters. The vessel 5 has a cap 15, which is also formed of ultrapure PFA and is frictionally engaged with the vessel. The flow rate is determined by the size of the vessel 5 and the vacuum level provided to the system which is preferably 100 Torr. A tube 9 of ultrapure PFA exits the vessel 5 and is coupled to a Venturi vacuum plump 11 to provide, along with the argon supply 1, a dynamic vacuum in the system including the vessel 5. The pump 11 is controlled by inert gas flow thereto along the ultrapure PFA tubing 8 from the supply 1 to the pump. The output of the pump 11 goes to a scrubber or exhaust. A flow rate from the argon source 1 of 1 liter per minute has been found to be desirable for a vessel having a volume of 125 milliliters. The restrictive orifice 3 controls the volume flow of argon from the argon supply 1 to the vessel 5 at the desired rate without the requirement of moving parts or other structures which can introduce contaminants into the system.

The restrictor 3 of FIG. 1 is shown in greater detail in FIGS. 2a and 2b. In the open condition, as shown in FIG. 2a, the PFA tubing 7 is in two sections and includes the restrictor 3 therein in one of the sections to control the volume of inert gas flow therethrough to the vessel 5. The two sections of the PFA tubing 7 are hermetically secured together by a PFA coupler 17 when in the closed configuration as shown in FIG. 2b. The PFA tubing 9 is also in two sections, the same as tubing 7 with the two section also coupled together with a PFA coupler 17. However, the tubing 9 does not require the restrictor 3.

The vessel 5 is heated with a radiant heat source 13 which is spaced from the vessel. The heat source 13 is optionally a halogen heat source and is not in contact with the vessel 5 to more uniformly distribute the heat in the vessel. The vessel 5 is enclosed in and spaced from the walls of a fluoropolymer-coated aluminum shield 14, preferably a tetrafluoroethylene coating, to further insure that the entire vessel is uniformly heated by the heater 13. This prevents condensation on the vessel 5 which can be a source of contaminants and lengthens evaporation times.

In operation, a known volume of a sample 18 to be tested is placed in the vessel 5 and the vessel is tilted as shown in FIG. 1 so that a corner formed by the vessel bottom and sidewalls is at the lowest point. The vessel 5 is then placed within the shield 14, preferably in the tilted position as noted above and as shown in FIG. 1, and adjacent but spaced from the heat source 13 and the sample 18 is uniformly heated. Concurrently, ultrapure argon from the argon supply 1 is passed along line 8 to the pump 11 and along line 7 and through the restrictive flow orifice 3 into the vessel 5 under a dynamic vacuum of 100 Torr as determined by the operation of the pump. The argon picks up volatiles from the sample formed in the vessel 5 due to heating and carries the volatiles out of the vessel along the tubing 9 to the pump 11. This procedure continues until all of the liquid and volatiles within the vessel 5 have been removed from the vessel with a solid deposit remaining in the lowermost portion thereof and the remaining space filled with argon. This solid deposit can then be removed for analysis to determine the content and quantity thereof in standard manner.

Referring to FIG. 3, there is a graph showing mole percentage of hydrogen peroxide in the vapor phase in mole percent as a function of total pressure in mm Hg. It can be seen from this graph that the vacuum in the system can be varied without the risk of explosion as long as operation is to the left of the solid line therein. The reason for preferential operation at 100 Torr is that the hydrogen peroxide vapor level can be much greater at that vacuum level and below without the risk of explosion due to the curvature at that point in the solid line separating explosive from non-explosive operation.

Figure 4:
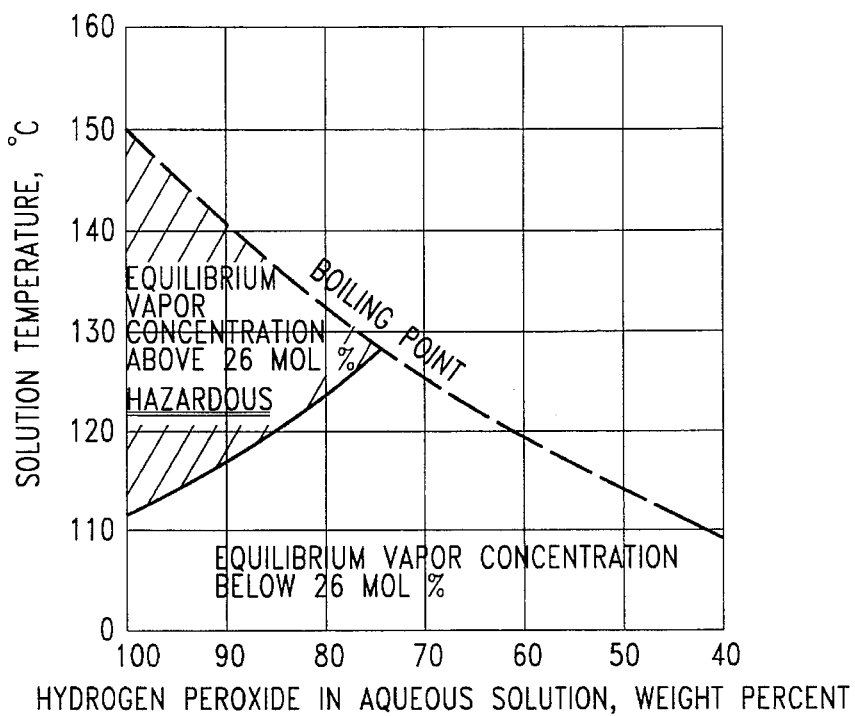
FIG. 4 is a graph showing temperature/liquid composition explosive region for weight percentage of hydrogen peroxide in aqueous solution as a function of temperature in °C.

Referring to FIG. 4, there is a graph showing the temperature/liquid composition explosive region for weight percentage of hydrogen peroxide in aqueous solution as a function of temperature in °C. It can be seen that the explosive region for hydrogen peroxide vapors diminishes with decreased concentration of aqueous hydrogen peroxide and decreased temperature. Accordingly, reducing the boiling temperature of the aqueous hydrogen peroxide to provide evaporation by reducing the pressure within the system also reduces the likelihood of explosion. This is evident from the fact that, in the event of loss of vacuum, the boiling point of the liquid would immediately increase and therefor be far above the boiling point of the liquid at the time of vacuum loss.

As an additional safety precaution (not shown), the pressure in the line 8 is monitored. If there is a loss of pressure in line 8 the pump 11 will cease to create a vacuum in the rest of the system. Accordingly, when the loss of pressure in the line 8 is sensed, the heater 13 is immediately turned off to minimize further evaporation of the hydrogen peroxide in the vessel 5.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modifications.

We claim:

1. An ultraclean evaporation system for hydrogen peroxide samples which comprises:

(a) a vessel having an inlet and an outlet formed of a fluoropolymer inert to hydrogen peroxide and having an impurity level less than the impurity level of hydrogen peroxide samples to be analyzed therein;

(b) a radiant heater spaced from said vessel for uniformly heating the contents of said vessel;

(c) a shield coated with a fluoropolymer encasing said vessel in conjunction with said heater:

(d) an inert gas supply coupled to said vessel with a coupler of fluoropolymer inert to hydrogen peroxide; and (e) a vacuum pump coupled to the outlet of said vessel for creating a dynamic vacuum in said vessel to maintain a mole percentage of hydrogen peroxide vapor in said vessel below an equivalent of 26 mole percent at atmospheric pressure.

2. The system of claim 1 further including an orifice formed of a fluoropolymer inert to hydrogen peroxide disposed at said inlet for controlling a flow rate of said inert gas supply to said vessel.

3. The system of claim 1 wherein said vessel and said coupler are formed of ultrapure PFA.

4. The system of claim 1 wherein said vessel has a side wall and a bottom forming a corner, said vessel having a lowest region, said vessel being disposed so that said corner is the lowest region of said vessel.

5. The system of claim 1 wherein said dynamic vacuum is about 100 Torr.

6. The system of claim 1 wherein said coupler has a length of at least about 3 meters.

7. The system of claim 6 wherein said vessel and said coupler are formed of ultrapure PFA.

8. The system of claim 6 wherein said vessel has a side wall and a bottom forming a corner, said vessel having a lowest region, said vessel being disposed so that said corner is the lowest region of said vessel.

9. The system of claim 1, wherein said vacuum pump is a Venturi vacuum pump and wherein said inert gas supply is directly coupled to said Venturi vacuum pump.

10. The system of claim 9 wherein said dynamic vacuum is about 100 Torr.

11. The system of claim 1 wherein said outlet from said vessel is formed of a fluoropolymer inert to hydrogen peroxide.

12. The system of claim 11 wherein said vessel, said coupler and said outlet are formed of ultrapure PFA.

13. The system of claim 12 wherein said vessel has a side wall and a bottom forming a corner, said vessel having a lowest region, said vessel being disposed so that said corner is the lowest region of said vessel.

14. The system of claim 11 further including an orifice formed of a fluoropolymer inert to hydrogen peroxide disposed at said inlet for controlling a flow rate of said inert gas supply to said vessel.

15. The system of claim 4 wherein said vessel, said coupler and said orifice are formed of ultrapure PFA.

16. The system of claim 14 wherein said vessel has a side wall and a bottom forming a corner, said vessel having a lowest region, said vessel being disposed so that said corner is the lowest region of said vessel.

17. The system of claim 14 wherein said vessel, said coupler, said outlet and said orifice are formed of ultrapure PFA.

18. The system of claim 17 wherein said vessel has a side wall and a bottom forming a corner, said vessel having a lowest region, said vessel being disposed so that said corner is the lowest region of said vessel.

19. The system of claim 4 wherein said coupler has a length of at least about 3 meters.

20. The system of claim 19 wherein said vessel, said coupler, said outlet and said orifice are formed of ultrapure PFA.

21. The system of claim 20 wherein said vessel has a side wall and a bottom forming a corner, said vessel having a lowest region, said vessel being disposed so that said corner is the lowest region of said vessel.

22. The system of claim 21 wherein said dynamic vacuum is about 100 Torr.

23. The system of claim 21, wherein said vacuum pump is a Venturi vacuum pump and wherein said inert gas supply is directly coupled to said Venturi vacuum pump.

24. The system of claim 23 wherein said dynamic vacuum is about 100 Torr.

* * * * *